United States Patent
Lang et al.

(10) Patent No.: US 8,423,522 B2
(45) Date of Patent: Apr. 16, 2013

(54) QUERY-AWARE COMPRESSION OF JOIN RESULTS

(75) Inventors: Christian A. Lang, New York, NY (US); Lipyeow Lim, Honolulu, HI (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 12/984,324

(22) Filed: Jan. 4, 2011

(65) Prior Publication Data

US 2012/0173517 A1 Jul. 5, 2012

(51) Int. Cl.
G06F 17/00 (2006.01)
G06F 7/00 (2006.01)

(52) U.S. Cl.
USPC ............ 707/693; 707/714; 707/722; 707/778

(58) Field of Classification Search .................. 707/793, 707/722, 714, 693, 778
See application file for complete search history.

(56) References Cited

U.S. PATENT DOCUMENTS

| | | | |
|---|---|---|---|
| 5,686,912 A * | 11/1997 | Clark et al. ..................... | 341/51 |
| 7,139,765 B1 * | 11/2006 | Balkany ............................... | 1/1 |
| 7,321,888 B2 * | 1/2008 | Day et al. ....................... | 707/722 |
| 2002/0165847 A1 * | 11/2002 | McCartney et al. .............. | 707/1 |
| 2006/0106870 A1 * | 5/2006 | Franaszek et al. ......... | 707/104.1 |
| 2007/0136346 A1 | 6/2007 | Morris et al. | |
| 2008/0027904 A1 | 1/2008 | Hill et al. | |
| 2008/0065596 A1 | 3/2008 | Shadmon et al. | |
| 2008/0133573 A1 | 6/2008 | Haft et al. | |
| 2008/0294863 A1 | 11/2008 | Faerber et al. | |
| 2008/0319939 A1 | 12/2008 | Tarin | |
| 2009/0006399 A1 | 1/2009 | Raman et al. | |
| 2009/0012990 A1 | 1/2009 | Lariba-Pey et al. | |
| 2009/0094236 A1 | 4/2009 | Renkes et al. | |
| 2010/0194607 A1 * | 8/2010 | Smith ............................. | 341/51 |
| 2011/0016098 A1 * | 1/2011 | Teerlink ........................ | 707/693 |
| 2011/0313980 A1 * | 12/2011 | Faerber et al. ................. | 707/693 |

OTHER PUBLICATIONS

Chen, Z., et al., "Query Optimization in Compressed Database Systems," ACM SIGMOD May 21-24, 2001 Santa Barbara, California, USA, Copyright 2001 ACM 1-58113-332-4/01/05.

* cited by examiner

*Primary Examiner* — Cam Truong
(74) *Attorney, Agent, or Firm* — Thomas Grzesik; Fleit Gibbons Gutman Bongini & Bianco PL

(57) ABSTRACT

A method is provided for compressing results of a join query. A join order of a result set comprising multiple tuples is determined from the join query, and a nested hierarchy of dictionaries is maintained based on the join order. The nested hierarchy of dictionaries is used to encode each of the tuples of the result set so as to produce an encode tuple, and each of the encoded tuples is transmitted to a client system. Also provided is a method for decompressing results of a join query.

9 Claims, 7 Drawing Sheets

402 — Given: Query with nested joins
404 — Optionally: determine join order J(J1(J1.1(...),J1.2(...)),J2(J2.1(...),J2.2(...)))

406 — For each result tuple T=J(T1,T2),
- Call encode(T, 0) → (S,n)
- Send S back to caller 408 — Function encode(T, join_id):
- If T is tuple in base table,
  410 — Get id n for T in dictionary join_id
  412 — If T was not yet in dictionary,
  - Return ((T, join_id), n)
  414 — Else
  - Return (∅, n)
416 —
- Else  /* T = Jx(T1,T2) where x = join_id */
  418 — Call encode(T1, join_id.1) → (S1,n1)
  420 — Call encode(T2, join_id.2) → (S2,n2)
  422 — Get id n for (n1,n2) in dictionary join_id
  424 — If (n1,n2) was not yet in dictionary,
    426 — Return (S1•S2•((n1,n2), join_id), n)
  428 — else
    430 — Return (S1•S2, n)

FIG. 4

QUERY-AWARE COMPRESSION OF JOIN RESULTS

FIELD OF THE INVENTION

The present invention generally relates to database management systems, and more particularly relates to join queries.

BACKGROUND OF THE INVENTION

Application programs often need to retrieve data from remote database servers using a data access API (application programming interface) such as JDBC (Java Database Connectivity). In the case of join queries, the result set (from the join) can be quite large. Therefore, transmitting the results from the server to the client can significantly increase latency delays and also affects the query response time.

SUMMARY OF THE INVENTION

One embodiment of the present invention provides a method for compressing results of a join query. According to the method, a join order of a result set comprising multiple tuples is determined from the join query, and a nested hierarchy of dictionaries is maintained based on the join order. The nested hierarchy of dictionaries is used to encode each of the tuples of the result set so as to produce an encode tuple, and each of the encoded tuples is transmitted to a client system.

Another embodiment of the present invention provides a method for decompressing results of a join query. According to the method, a join order of a result set comprising multiple tuples is determined from the join query. Dictionary entries for the result set are received, and a nested hierarchy of dictionaries is created based on the join order and the dictionary entries. Encoded tuples are received, and the nested hierarchy of dictionaries is used to decode the encoded tuples so as to produce the tuples of the result set.

Other objects, features, and advantages of the present invention will become apparent from the following detailed description. It should be understood, however, that the detailed description and specific examples, while indicating various embodiments of the present invention, are given by way of illustration only and various modifications may naturally be performed without deviating from the present invention.

BRIEF DESCRIPTION OF THE DRAWINGS

FIG. 4 shows pseudo-code for encoding nested join results according to one embodiment of the present invention;

DETAILED DESCRIPTION

Various embodiments of the present invention will be discussed in detail hereinbelow with reference to the attached drawings.

Embodiments of the present invention compress the result sets of join queries for more efficient transmission. The join query is exploited in order to partition the join result set. The redundancy in the joined data is also exploited. For example, consider the simple case in which the query is a join between two tables, Table A and Table B. The join results comprise tuples with some subset of columns from Table A and another subset of columns from Table B. Without loss of generality, assume the tuples are of the form <columns(A), columns(B)>. As the results are scanned, a dictionary is maintained for each table; the same dictionary is maintained in synchronization. As the results are scanned, if a value for columns(A) is not in dictionary(A), the value is inserted into the dictionary and the value is transmitted in plaintext along with a flag. Otherwise the code for the value is transmitted. The process applies to the values of columns(B). As the stream of code is read, it is checked for a plaintext flag. If the flag exists, the code is treated as plaintext and inserted into the dictionary. Otherwise, a lookup is performed in the dictionary to decode the code. If the joins involve multiple tables, a join ordering can be exploited to perform cascading or nested encoding.

Figure 1:
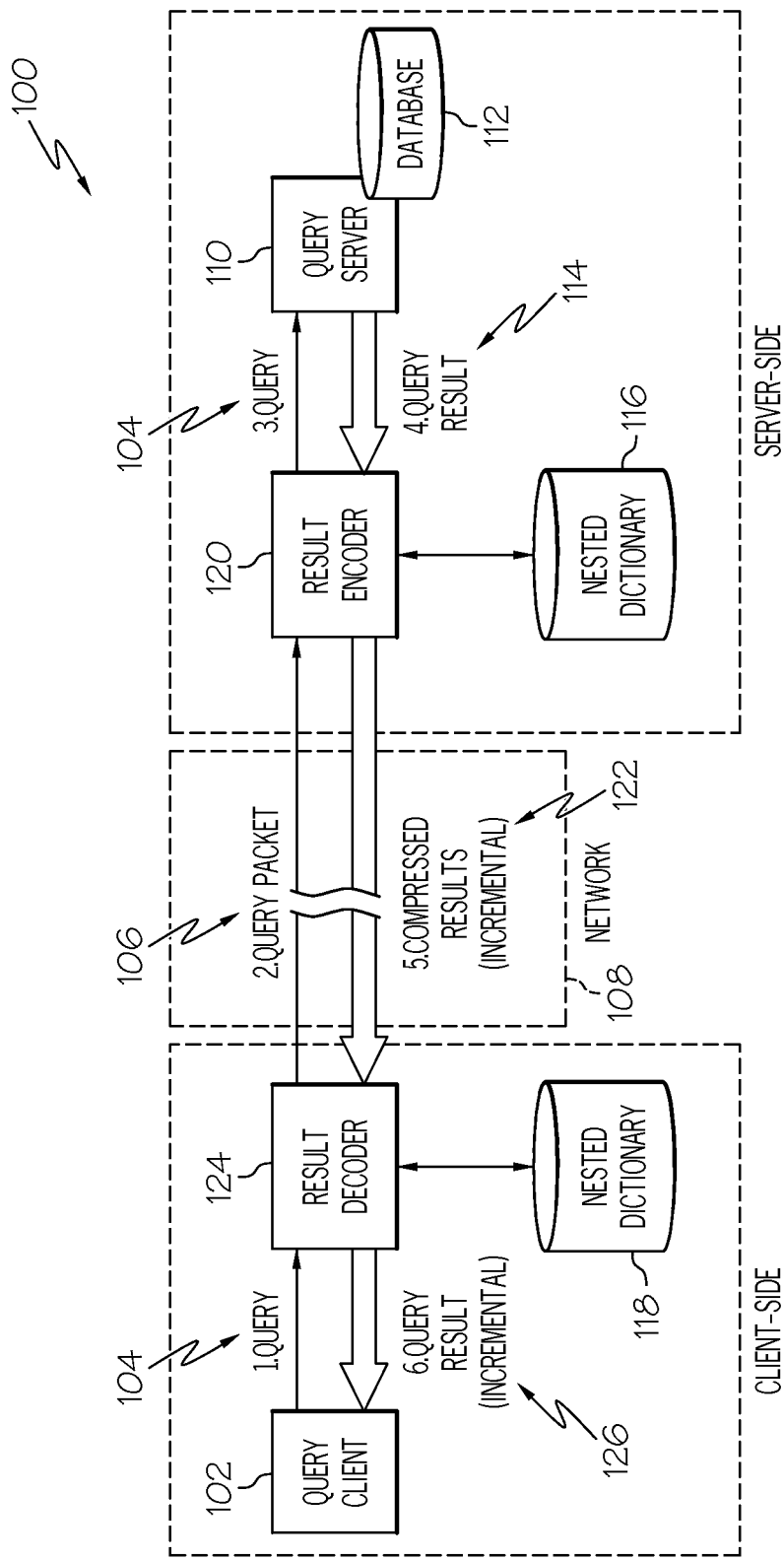
FIG. 1 is a block diagram illustrating an exemplary operating environment applicable to embodiments of the present invention.

FIG. 1 shows an exemplary system architecture applicable to embodiments of the present invention. The system architecture 100, in this exemplary embodiment, is in the context of a client/server setting in which a client 102 issues queries 104 that are transmitted as query packets 106 over a network 108. A server 110 receives and processes the queries 104 against one or more databases 112 to obtain a query result 114. The query result 114 is a result from a set of join operations on data at the database 112 and can be very large (especially if join-like queries are involved). Therefore, embodiments of the present invention compress the result 114 before sending it back over the network 108 to the client 102. This embodiment also provides incremental compression and transmission in order to allow for overlapping of transmission and result processing on the client side.

While some traditional compression methods use dictionaries to indicate how various data tokens are compressed, this embodiment of the present invention provides a novel "nested dictionary" 116 and 118 that is particularly suited for compressing join results of varying nesting complexity. In this embodiment, a result encoder 120 receives the join result 114 (which can be incremental) from the query server 110 and consults/updates a local nested dictionary 116 to generate the compressed query result 122 as output. This compressed query result 122 is then transmitted over the network 108 and received by a result decoder 124 at the client side. The result decoder 124 decompresses the results using its own local nested dictionary 118. These decompressed results 126 (which can be incremental) are then passed to the query client 102.

While FIG. 1 shows the query 104 passing through the result decoder 124 and the query packet 106 passing through the result encoder 120, in some embodiments the decoder 124 and encoder 120 are situated in the transmission paths of the query client 102 and query server 110. However, this configuration is not required and the query 104 and packets 106 are not required to pass through these components during their transmission from the client 102 to the server 110.

Figure 2:
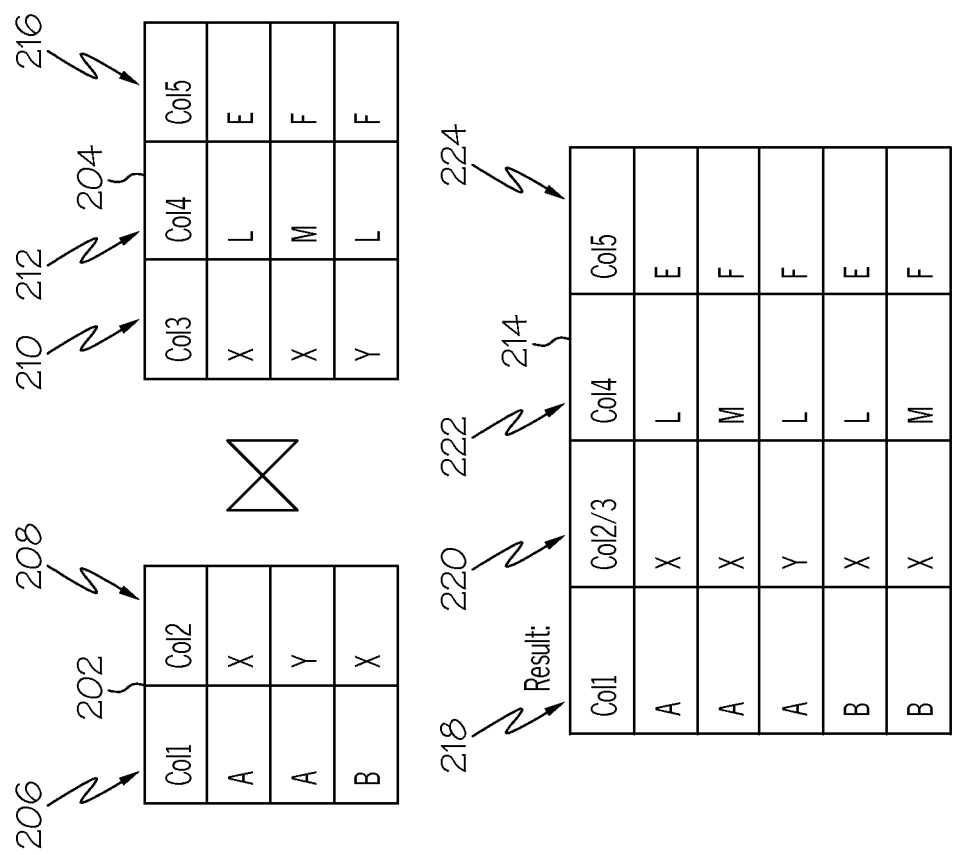
FIGS. 2 and 3 show examples of tables used in a join operation and the results of the join operation in accordance with one embodiment of the present invention.
Figure 3:
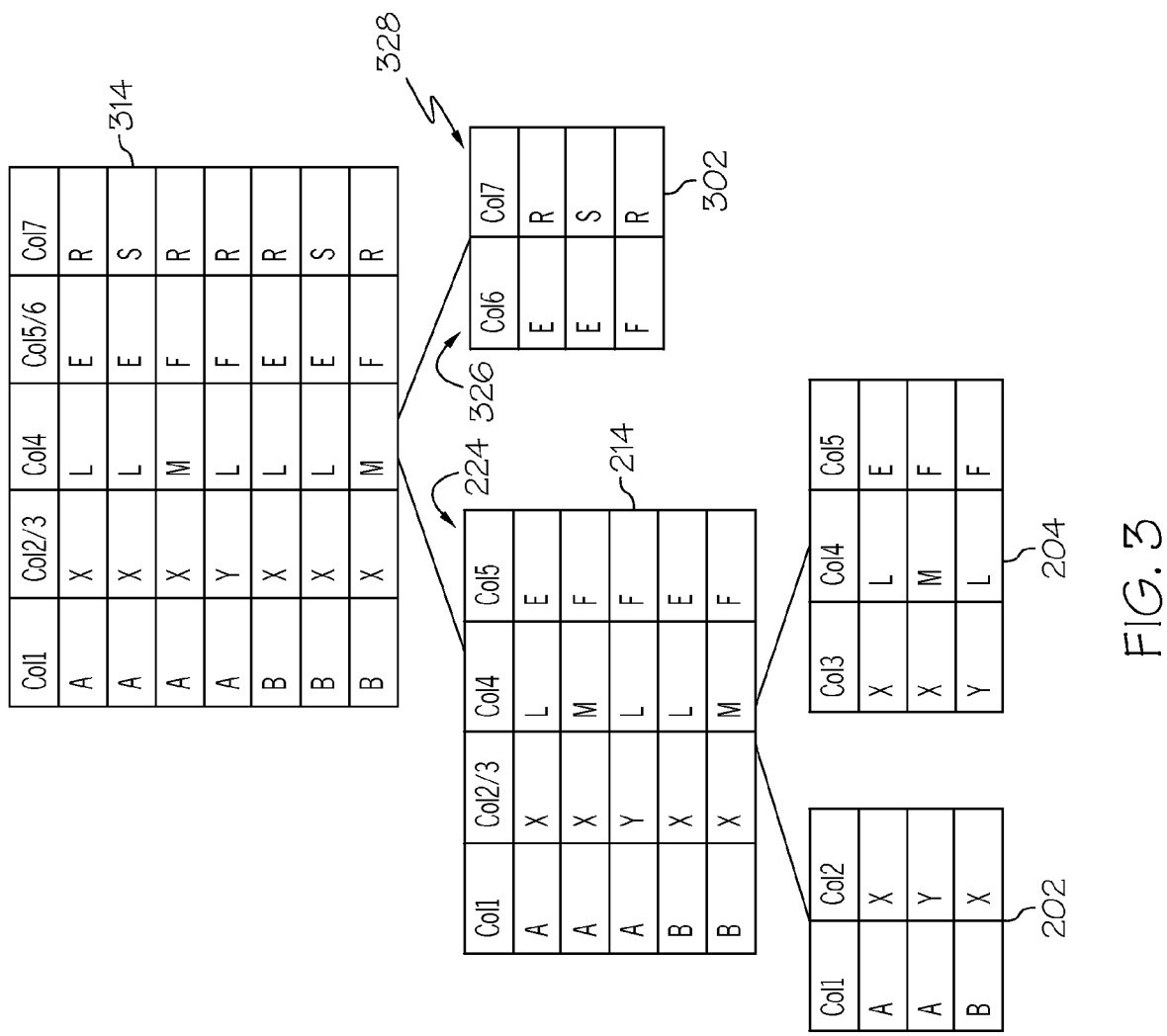

FIGS. 2-4 illustrates the compression process of one embodiment of the present invention. In particular, FIG. 2 shows a first table 202 in the database 112, a second table 204 in the database 112, and a result 214 from a join operation on these tables 202 and 204 based on a query 104 received by the query server 110 from the client 102. The result encoder 120 is able to exploit knowledge of the join information to reduce the size of the transmitted result data table 214.

As shown, the first table 202 comprises two columns, Col1 206 and Col2 208. The second table 204 comprises three columns, Col3 210, Col4 212, and Col5 216. In this example, the issued query is a join of the two tables 202 and 204 with an equality condition between Col2 206 and Col3 208. The result set 214 is shown as a table with four columns, Col1 218, Col2/3 220, Col4 222, and Col5 224.

If this result data table 214 were to be transmitted as shown in FIG. 2, the data would be about 400 bytes long (assuming 20 bytes per field). In particular, the result data table 214 comprises four columns of data and the following data would be transmitted.

(A,X,L,E)
(A,X,M,F)
(A,Y,L,F)
(B,X,L,E)
(B,X,M,F)

So with each field being 20 bytes, this results in approximately 400 bytes of data.

Instead, in this embodiment, the size of the transmitted result data table 214 is reduced/compressed by maintaining a dictionary 116 and 118 that assigns a short identifier to each field value, as shown in Table 1 below. The result encoder 120 analyzes the result data table 214 and translates each tuple into a compressed format that comprises short identifiers and also generates dictionary entry information that is transmitted therewith. Table 1 shows one example of a dictionary 116 and 118 that is generated for the result data table 214 of FIG. 2. This example of a compressed format is (Dict_Entry_No/Col1, Dict_Entry_No/Col2, Dict_Entry_No/Col3, . . . Dict_Entry_No/ColN). This format comprises a number of elements equal to the number of elements in the tuples, with each identifier/value of this format identifying a dictionary entry (Dict_Entry_No) and where each position in the format corresponds to a given column of the result data table 214.

For example, the first tuple of the result data table 214 in FIG. 2 is (A,X,L,E). The result encoder 120 compresses this first tuple into a compressed format that comprises short identifiers such as (1,1,1,1). Note that because the original tuple (A,X,L,E) comprises four values the compressed format also comprises four values. The compressed tuple format (1,1,1,1) identifies to the result decoder 124 the dictionary entries to retrieve for decoding this compressed data, with each position in this format corresponding to a column in the result data table 214 and identifying which entry (e.g., the first or second entry) in the dictionary to use for the particular column. The compressed tuple format of "(1,1,1,1)" indicates that this tuple comprises the first entry in the dictionary for Col1 218, followed by the first entry in the dictionary for Col2 220, followed by the first entry in the dictionary for Col3 222, followed by the first entry in the dictionary for Col4 224.

Stated differently, each position within the compressed format corresponds to a column in the result data table 214. Starting from the leftmost element in the compressed format and moving to the right, the first position corresponds to Col1 218, the second position corresponds to Col2 220, the third position corresponds to Col3 222, and the fourth position corresponds to Col4. The identifier/value at each position corresponds to the entry within the dictionary (e.g., the first entry) for the given column where the corresponding value of the original (uncompressed) tuple can be located. For example, a "1" in the first position of the compressed format indicates to the result decoder 124 to look in its dictionary for the value under the first entry for Col1. As can be seen from Table 1, the result decoder 124 decodes (1,1,1,1) into the first tuple (A,X,L,E).

The result encoder 120 also generates dictionary entry information that is used to store information in a dictionary. Table 1 below shows one example of a dictionary maintained by both the encoder 120 and decoder 124 based on the dictionary entry information generated by the encoder 120. In this embodiment, each row of the table is in itself a separate dictionary. The set of rows within the table is a nested hierarchy of dictionaries based on the join order.

TABLE 1

| Tuple Dictionary | | |
|---|---|---|
| Result Data Column | Entry 1 | Entry 2 |
| Col1 | A | B |
| Col2/3 | X | Y |
| Col4 | L | M |
| Col5 | E | F |

In this embodiment, the dictionary entries are generated in the formation of (Value, Row), where "Value" is a value within the tuple and "Row" identifies the row within the dictionary 116 where the value corresponding to "Value" is to be added. In this embodiment, each row of the dictionary 116 corresponds to a column in the result data table 214. For the first tuple of (A,X,L,E), the result encoder 120 generates dictionary entries (A,1), (X,2), (L,3), and (E,4), and adds these entries into its dictionary 116. The "A" in "(A,1)" indicates that value "A" is to be added to the dictionary 116 in the first row (corresponding to Col1 of the result data table 214), as indicated by the "1". The "X" in "(X,2)" indicates that value "X" is to be added to the dictionary 116 in the second row (corresponding to Col2/3 of the result data table 214), as indicated by the "2". The "L" in "(L,3)" indicates that value "L" is to be added to the dictionary 116 in the third row (corresponding to Col4 of the result data table 214), as indicated by the "3". The "E" in "(E,4)" indicates that value "E" is to be added to the dictionary 116 in the fourth row (corresponding to Col5 of the result data table 214), as indicated by the "4". As can be seen from Table 1 above, the dictionary 116 only comprises one unique entry for each value in the result data table 214. Because these dictionary entries are associated with the first tuple (A,X,L,E), they are entered into the first entry location of the dictionary 116 (because no other entries have been added for the columns at this point).

In this embodiment, the dictionary entries (A,1), (X,2), (L,3), and (E,4) are transmitted before the compressed tuple (1,1,1,1) and, therefore, are received by the result decoder 120 prior to the compressed tuple. However, this is not required. When the decoder 120 receives these dictionary entries, it adds the corresponding information into its dictionary 118. Therefore, the dictionaries 116 and 118 of the encoder 120 and decoder 124 remain synchronized.

In this embodiment, as the encoder 120 scans the results, if a value is not in its corresponding dictionary the encoder 120 inserts the value into the dictionary, and transmits the value in plaintext along with a flag. Otherwise the encoder 120 transmits the code for the value. When the decoder 124 receives this data, it analyzes the received data to determine if there is a plaintext flag. If the flag exists, the decoder 124 treats this code as plaintext and inserts it into the corresponding dictionary. Otherwise, the decoder 124 performs a look up in the corresponding dictionary to decode the code.

For the second tuple (A,X,M,F) in the result data table 214 of FIG. 2, the result encoder 120 only needs to add "M" and "F" to the dictionary because "A" and "X" are already in the dictionary. Therefore, the result encoder 120 creates dictionary data items (M,3) and (F,4), which are transmitted in addition to the compressed tuple (1,1,2,2). The transmitted dictionary entry data indicates that "M" is added to the dictionary 116 as a second entry (since "L" has already been added in the first entry) in the third row of the result data table 214; "F" is added to the dictionary 116 as a second entry (since "E" has already been added in the first entry) in the fourth row of the result data table 214.

The transmitted compressed tuple (1,1,2,2) indicates to the decoder 124 that the first element of the uncompressed tuple is the value, "A", in the first dictionary entry in the first row corresponding to Col1; the second element is the value, "X", in first dictionary entry in the second row corresponding to Col2/3; the third element is the value, "M" in the second dictionary entry in the third row corresponding to Col4; and the fourth element is the value "F" in the dictionary second entry for the fourth row corresponding to Col5. Therefore, when the result decoder 124 receives this compressed tuple (1,1,2,2), the decoder 124 uses its dictionary 118 to translate (1,1,2,2,) into (A,X,M,F), which is the second tuple of the result data table 214 of FIG. 2.

The encoder 120 performs similar operations for the remaining tuples (A,Y,L,F), (B,X,L,E), and (B,X,M,F) of the result data table 214. In particular, the dictionary entries and compressed tuple for (A,Y,L,F) are (Y,2) and (1,2,1,2); the dictionary entries and compressed tuple for (B,X,L,E) are (B,1) and (1,2,1,2); and the compressed tuple for (B,X,M,F) is (2,1,2,2). The last tuple (B,X,M,F) does not require any additional dictionary information because all field values of (B,X,M,F) are already stored in the dictionaries 116 and 118. Table 1 shows the data maintained by the dictionaries 116 and 118 after the encoder 120 has generated all of the necessary dictionary entries for the result data table 214 of FIG. 2. The format of the dictionary ensures that every unique value per column is transmitted only once, so as to reduce redundancy.

For the example shown in FIG. 2, the encoder 120 transmits the following as the compressed results 122 for the result data table 214 of FIG. 2.

4 col
(A,1), (X,2), (L,3), (E,4), (1,1,1,1)
(M,3), (F,4), (1,1,2,2)
(Y,2), (1,2,1,2)
(B,1), (1,2,1,2)
(2,1,2,2)

When the decoder 124 receives this compressed data it builds its dictionary 118 to comprise the same data as dictionary 118, and decodes the compressed data to obtain the tuples (A,X,L,E), (A,X,M,F), (A,Y,L,F), (B,X,L,E), and (B,X,M,F). Overall, due to this encoding, only 280 bytes (assuming each field is 20 bytes) of data need to be transmitted (including the dictionary data), which is a significant savings.

If a result table is a wide table with many columns, the encoder 120 of one embodiment also applies a second compression technique. This additional compression process significantly reduces the size of the transmitted data when the result set is very wide (many columns) and/or the join is deeply nested. Considering again the example shown in FIG. 2, instead of encoding each column value separately, the encoder 120 of this embodiment encodes each tuple of each side of a join separately. In the example of FIG. 2, there are three tuples on the left side (Table 202) of the join: AX, AY, and BX. There are also three tuples on the right side (Table 204) of the join: XLE, XMF, and YLF. When the encoder 120 is going to transmit the first tuple (A,X,L,E), the encoder 120 first generates a dictionary entry for the left component "AX" in the first table 202 and a dictionary entry for the right component "XLE" in the second table 204.

Thus, in this embodiment the format of the dictionary entries is (Value, Row), where "Value" is a value within the tuple and "Row" identifies the row within the dictionary 116 and 118 where the value corresponding to "Value" is to be added. Further, in this embodiment, each row of the dictionary 116 and 118 corresponds to each side (e.g., left side or right side) of the join operation. Stated differently, each row corresponds to each table (Table 1 202 and Table 2 204) used in the join operation. These dictionary entries are "(AX,1)" and "(XLE,2)", respectively.

These dictionary entries are then transmitted by the encoder 120 followed by the compressed tuple, which is now only "(1,1)". The compressed tuple "(1,1)" indicates to the decoder 124 to select the value "A,X" in the first entry of the dictionary for the first table 202 (the left side of the join) and also select the value "XLE" in the first entry of dictionary for the second table 204 (the right side of the join). In other words, the compressed tuple, in this embodiment, has a format of "(Entry_NO_Row_1, Entry_NO_Row_2)". The first position of the compressed tuple corresponds to the first row of the dictionary 116 and 118 and comprises a value identifying which entry of the first row to select, and the second position of the compressed tuple corresponds to the second row of the dictionary 116 and 118 and comprises a value identifying which entry of the second row to select. The second tuple (A,X,M,F) simply becomes a dictionary entry (XMF,2) followed by the compressed tuple (1,2), and so on. The resulting dictionaries created by the encoder 120 and decoder 124 based on these dictionary entries is shown below in Table 2. Similar to Table 1 above, the set of rows within the table is a nested hierarchy of dictionaries based on the join order.

TABLE 2

| | Tuple Dictionary | | |
|---|---|---|---|
| Result Data Column | Entry 1 | Entry 2 | Entry 3 |
| Table 1 (left side) | AX | AY | BX |
| Table 2 (right side) | XLE | XMF | YLF |

The encoder 120 transmits the following compressed results 122 for the result data table 214 of FIG. 2.

2 col
(AX,1), (XLE,2), (1,1)
(XMF,2), (1,2)
(AY,1), (YLF,2), (2,3)
(BX,1), (3,1)
(3,2)

When the decoder 124 receives this compressed data it builds its dictionary 118 to comprise the same data as dictionary 116, and decodes the compressed data to obtain the tuples (A,X,L,E), (A,X,M,F), (A,Y,L,F), (B,X,L,E), and (B,X,M,F). Because the example of FIG. 2 has a narrow result table as compared to a wide result table, the compression is slightly lower (e.g., 380 bytes assuming each field is 20 bytes) using this process. However, the compression is significantly greater when the result table is very wide and/or the join is nested and/or the columns are highly correlated, which lead to many identical tuples on either side.

FIG. 3 shows a set of exemplary tables for illustrating another compression process performed by the encoder 120 with respect to nested joins. In this example, a first join operation is performed on a first table 202 and a second table 204. A second join operation is then performed on the result table 214 from the first join operation and a third table 302. This second join operation yields a final results table 314.

The example of FIG. 3 uses the first two tables 202 and 204 and the results table 214 of FIG. 2. The third table 302 in FIG. 3 comprises two columns Col6 326 and Col7 328. The new join condition is an equality between Col5 224 of the results table 214 and Col6 326 of the third table 302. The overall join result is shown as a new results table 314. One example of a set of nested dictionaries for the compression process discussed below is shown in Tables 3 and 4. In this embodiment, each row of the dictionaries in Tables 3 and 4 corresponds to each table used in the respective join operation associated therewith

TABLE 3

Tuple Dictionary 1 For Second Join

| Result Data Column | Entry 1 | Entry 2 | Entry 3 | Entry 4 | Entry 5 |
|---|---|---|---|---|---|
| Table 1 (left side) | ax | ay | bz | cx | cy |
| Table 2 (right side) | ER | ES | FR | | |

TABLE 4

Tuple Dictionary 2 For First Join

| Result Data Column | Entry 1 | Entry 2 | Entry 3 |
|---|---|---|---|
| Table 1 (left side) | AX(=a) | AY(=b) | BX(=c) |
| Table 2 (right side) | XLE(=x) | XMF(=y) | YLF(=z) |

The first tuple in the results table 314 is (A,X,L,E,R). In order to compress this first tuple, the encoder 120 utilizes the second compression technique discussed above and creates dictionary entries (ax,1) and (ER,2) based on the uppermost join between table 214 and table 302. Here, "(ax,1)" represents the tuple (A,X,L,E) from the left side of the join (i.e., Table 214) and "(ER,2)" represents the tuple (E,R) from the right side of the join (i.e., table 302). In this example, (A,X,L,E) is itself the result of a join from tables 202 and 204. Therefore, the encoder 120 recursively encodes the tuple (A,X,L,E) by considering the left side (table 202) and right side (table 204) of that join operation. In other words, the "ax" in (ax,1) represents "(AX)(XLE)". Therefore, the encoder 120 creates the dictionary entries (AX,1.1) and (XLE,1.2) and updates its dictionaries for the left side (table 202) and right side (table 204) of the first join operation accordingly, as shown in Table 4.

Therefore, the overall encoding of the first tuple is (AX, 1.1), (XLE,1.2), (ax,1), (ER,2), and (1,1). This indicates that "AX" and "XLE" are added to first join's dictionary (Table 4) in the first entry of the first row (corresponding to Table 1 202) and the first entry of the second row (corresponding to Table 2 204), respectively. The elements "1.1" and "1.2" of (AX, 1.1), (XLE,1.2) are exemplary identifiers that indicate that the preceding element (such as "AX" and "XLE", respectively) is to be placed in the dictionary (see Table 4) associated with the first join operation for the left row and the right row, respectively. In other words, the "1.1" and "1.2" value identify the table from which "AX" and "XLE" came.

The element "ax" in the first position of "(ax,1)" comprises two positions, a first position comprising "a" and a second position comprising "x". The first position corresponds to the first element "AX" in the first dictionary entry (AX,1.1) and the second position corresponds to the first element "XLE" in the second dictionary entry (XLE,1.2) of the transmitted compressed tuple. The element "ax" represents the concatenation of the first entry (AX) of left the lower join side (table 202) and the first entry (XLE) of the right lower join side (table 204). The "1" in the second position of "(ax,1)" indicates that element "ax" is to be added to an entry in the first row in the upper join dictionary (See Table 3). Therefore, based on this format, when the decoder 124 receives this transmitted dictionary entry information along with the compressed tuple and detects (ax,1), it knows to associate "a" with "AX" and "x" with "XLE" in its dictionaries.

The element "ER, 2" indicates that "ER" is to be added to an entry in the second row of the upper join's dictionaries, as shown in Table 3. The compressed tuple (1,1) represents a concatenation of the first entry (ax) of the left upper join side (table 214) and the first entry (ER) of right upper join side (table 302). Therefore, the first position in the compressed tuple (1,1) corresponds to the dictionary associated with the upper join dictionary (Table 3) and the value at the first position corresponds to the entry number associated with the first row for obtaining a value. Because a "1" exists at the first position of the compressed tuple (1,1), this indicates to the decoder 124 that the first entry is to be selected from the first row of the upper join dictionary (Table 3), which comprises "ax". In this embodiment, the entries for the first row of the upper join dictionary can comprise a pointer or any other type of mapping to the entries of the first and second rows of the lower join dictionary. Thus, the dictionaries are nested and comprise a set of leaf level dictionaries and a set of intermediate level dictionaries. The set of leaf level dictionaries map data tuple fragments to a first set of code and the set of intermediate level dictionaries map a tuple created from the first set of code to a second set of code that is smaller than the first set of code.

The second position in the compressed tuple (1,1) corresponds to the dictionary associated with the lower join dictionary and the value at the second position corresponds to the entry number associated with the second row for obtaining a value. Because a "1" exists at the second position of the compressed tuple (1,1), this indicates to the decoder 124 that the first entry is to be selected from the second row of the lower join dictionary, which comprises "XLE".

Returning now to second result table 314, the encoder 120 encodes the second tuple (A,X,L,E,S) as (ES,2) and (1,2). As the encoder 120 generates the dictionary entries it adds this dictionary information into its dictionaries 116. The encoder 120 only generates a dictionary entry of (ES,2) because dictionary entries have already been generated for "AX" and "XLE". Because "ES" comes from the right side (table 302) of the upper join, the dictionary entry comprises a "2" in the second position. This indicates that "ES" is to be added to the dictionary for the upper join in the second entry for Col2. The compressed tuple (1,2) indicates to the decoder 124 that the first entry value, "ax", for Coi1 of the lower join dictionary and the second entry value, "ES", for Col2 of the upper join dictionary are to be used to decode this compressed tuple. Therefore, when the decoder 124 receives (ES,2) and (1,2), it enters appropriate dictionary information based on the dictionary entry (ES,2) and decodes the compressed tuple of (1,2) into (A,X,L,E,S). Even though "ax" is equal to (AX) (XLE) and the other decoded element is equal to (ES), the decoded result is not (A,X,X,L,E,E,S) because a join operation has be performed. Therefore, the decoded result is (A,X, L,E,S).

The above processes are performed on the remaining tuples and the encoder 120 transmits the following information to the decoder 124.

2 col
(AX,1.1), (XLE,1.2), (ax,1), (ER,2), (1,1)
(ES,2), (1,2)
(XMF,1.2), (ay,1), (FR,2), (2,3)
(AY,1.1), (YLF,1.2), (bz,1), (3,3)
(BX,1.1), (cx,1), (4,1)
(4,2)
(cy,1), (5,3)

When the decoder 124 receives this set of information comprising dictionary entries and compressed tuples, it builds its dictionaries 118 to decode the compressed tuples. For example, the decoder 124 translates (1,1) into (A,X,L,E,R), (1,2) into (A,X,L,E,S), (2,3) into (A,X,M,F,R), (3,3) into (A,Y,L,F,R), (4,1) into (B,X,L,E,R), (4,2) into (B,X,L,E,S), and (5,3) into (B,X,M,F,R).

FIG. 4 shows exemplary pseudo-code for the encoding/compression technique explained above with respect to FIG. 3. At line 402 a query with nested joins is received. At line 404 a join order is optionally determined. Determining the join order can affect the compression effectiveness and picking the correct join order can be based on any criteria such as optimizer cost estimations, sampling, and/or some fixed heuristics.

At line 406 a result tuple T is obtained by joining tables T1 and T2. For example, a first result tuple of T=(A,X,L,E,R) is obtained by joining (A,X,L,E) and (E,R), where (A,X,L,E)=T1 and (E,R)=T2. A recursive encoding function is then called beginning at line 408. This recursive encoding function spans from line 408 to line 430. At line 410 a determination is made as to whether T is in a base table (e.g., a table used in the join operation). If so, an identifier n for T in dictionary join_id is obtained, where dictionary join_id identifies the table from which T came from. If this Tuple T is not in the dictionary, then a dictionary entry such as (AX, 1.1) in the format of ((T, join_id), n) is returned at line 412. Otherwise a dictionary entry is not returned at line 414.

If T is not in the base table, then the process goes to the else branch 416, where T=Jx(T1,T2) where x=join_id. For example, the tuple (A,X,L,E,R) is not in a base table. Therefore, for tuple (A,X,L,E,R) the else branch 416 is performed so that recursive encoding functions (line 408) are called for each of the join components T1 and T2 of tuple (A,X,L,E,R) at lines 418 and 420, respectively. The output of these recursive encoding operations occurs at lines 426 and 430 based on whether identifiers are already in the dictionary (lines 424 and 428). For example, recursive encoding functions are called for (A,X,L,E) and (E,R), with the recursive encoding function being performed on the "(A,X)" and "(X,L,E)" components of (A,X,L,E). The result of this recursive encoding process for the tuple (A,X,L,E,R) comprises the dictionary entries of (AX,1.1), (XLE,1.2), (ax,1) and (ER,2) with a compressed tuple (1,1).

Thus, the compression technique for nested joins takes advantage of the join nesting information to provide a more efficient compression result than conventional techniques. Assuming that each field is 20 bytes, an uncompressed transmission would be around 700 bytes (35 fields×20 bytes). However, with the compression technique explained above with respect to FIG. 3, the transmission size is 460 bytes. This technique can be extended to arbitrarily nested joins. Also, as the amount of nesting increases, the compression provided by the above compression technique also increases.

The various compression techniques discussed above are fully incremental in that one tuple can be transmitted after the other (together with some dictionary entries). Thus, the client can receive and decode these tuples incrementally via the decoder 124. This allows for overlap between decoding, tuple processing, and transmission, so as to reduce the overall response time. Traditional compression has less information about the result set table to be compressed and, therefore, is much less beneficial as compared to embodiments of the present invention. Specifically, conventional compression techniques do not comprise or utilize information regarding the join nesting that led to the result set. The various compression techniques of explained above can be combined or can be mixed in further embodiments to generate the compressed result.

Figure 5:
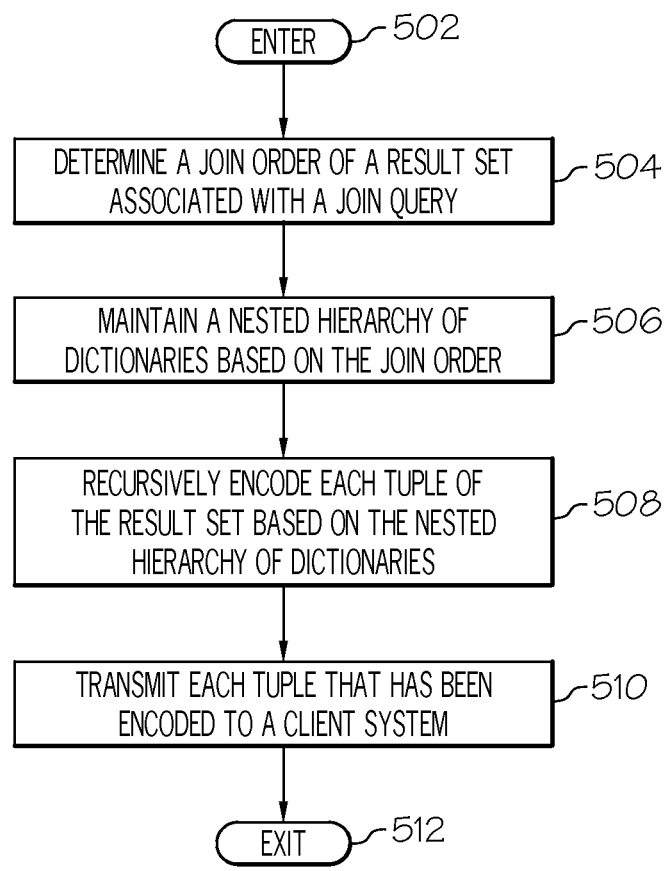
FIG. 5 is an operational flow diagram for compressing/encoding results of a join query according to one embodiment of the present invention.

FIG. 5 is an operational flow diagram for compressing results of a join query according to one embodiment of the present invention. The operational flow diagram of FIG. 5 begins at step 502 and flows directly to step 504. An encoder 120 at a query server 110 determines a join order of a result set associated with a join query 104, at step 504. The encoder 120 maintains a nested hierarchy of dictionaries based on the join order, at step 506. The encoder 120 recursively encodes each tuple of the result set based on the nested hierarchy of dictionaries, at step 508. The encoder 120 transmits each tuple that has been encoded to a client system 102. The control flow then exits at step 512.

Figure 6:
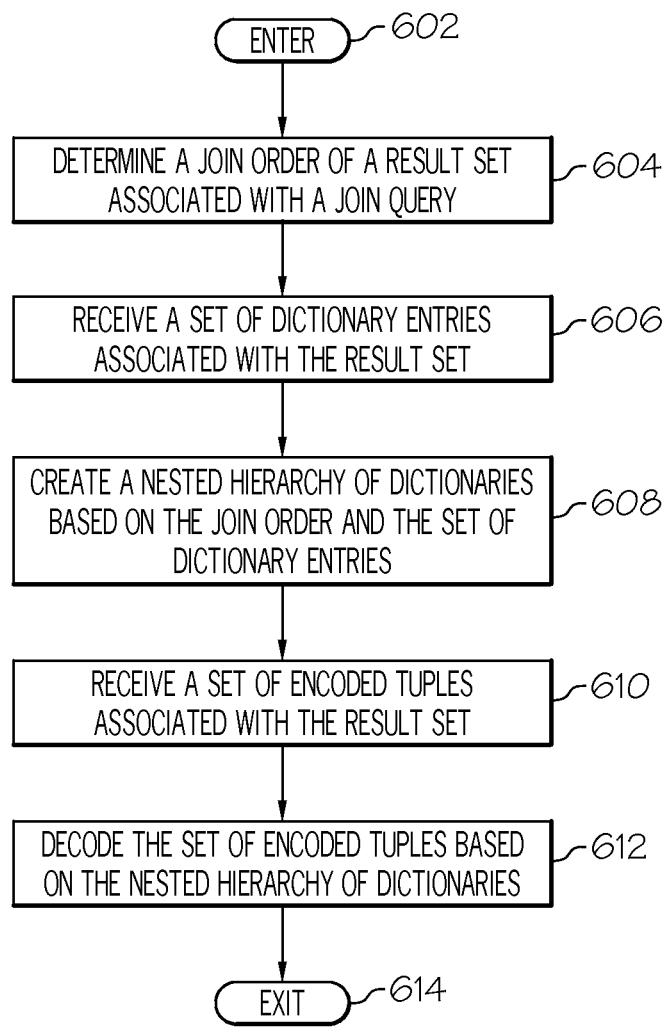
FIG. 6 is an operational flow diagram for decompressing/decoding results of a join query according to one embodiment of the present invention.

FIG. 6 is an operational flow diagram for decompressing results of a join query according to one embodiment of the present invention. The operational flow diagram of FIG. 6 begins at step 602 and flows directly to step 604. A decoder 124 at a client system 102 determines a join order of a result set associated with a join query 104, at step 604. The decoder 124 receives a set of dictionary entries associated with the result set, at step 606. The decoder 124 creates a nested hierarchy of dictionaries based on the join order and the set of dictionary entries, at step 608. The decoder 124 receives a set of encoded tuples associated with the result set from an encoder 120 at the query server 110, at step 610. The decoder 124 decodes each set of encoded tuples based on the nested hierarchy of dictionaries, at step 612. The control flow then exits at step 514.

Figure 7:
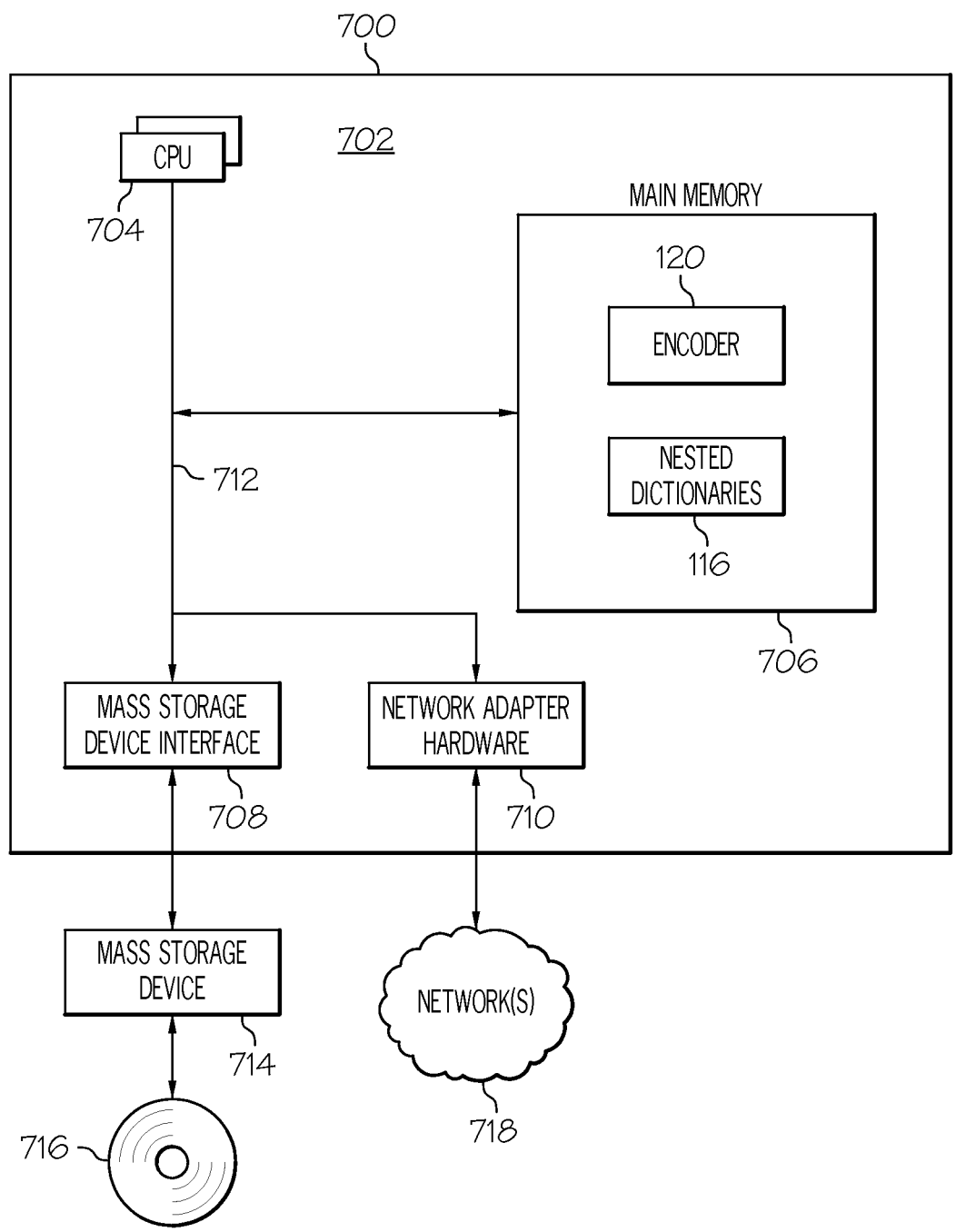
FIG. 7 is a block diagram illustrating an exemplary information processing system that can be utilized in the operating environment of FIG. 1.

FIG. 7 is a block diagram illustrating an exemplary information processing system that can be utilized in the operating environment of FIG. 1, such as for the client system or the query server. The information processing system 700 is based upon a suitably configured processing system adapted to implement one or more embodiments of the present invention. Similarly, any suitably configured processing system can be used as the information processing system 700 by embodiments of the present invention.

The information processing system 700 includes a computer 702. The computer 702 has a processor(s) 704 that is connected to a main memory 706, mass storage interface 708, and network adapter hardware 710. A system bus 712 interconnects these system components. The main memory 706, in this embodiment, comprises the encoder (or the decoder), their components, and the nested dictionaries.

Although illustrated as concurrently resident in the main memory 706, it is clear that respective components of the main memory 706 are not required to be completely resident in the main memory 706 at all times or even at the same time. In this embodiment, the information processing system 700 utilizes conventional virtual addressing mechanisms to allow programs to behave as if they have access to a large, single storage entity, referred to herein as a computer system memory, instead of access to multiple, smaller storage entities such as the main memory 706 and data storage device

716. The term "computer system memory" is used herein to generically refer to the entire virtual memory of the information processing system 700.

The mass storage interface 708 is used to connect mass storage devices, such as mass storage device 714, to the information processing system 700. One specific type of data storage device is an optical drive such as a CD/DVD drive, which may be used to store data to and read data from a computer readable medium or storage product such as (but not limited to) a CD/DVD 716. Another type of data storage device is a data storage device configured to support, for example, NTFS type file system operations.

Although only one CPU 704 is illustrated for computer 702, computer systems with multiple CPUs can be used equally effectively. Embodiments of the present invention further incorporate interfaces that each includes separate, fully programmed microprocessors that are used to off-load processing from the CPU 704. An operating system included in the main memory is a suitable multitasking operating system such as any of the Linux, UNIX, Windows, and Windows Server based operating systems. Embodiments of the present invention are able to use any other suitable operating system. Some embodiments of the present invention utilize architectures, such as an object oriented framework mechanism, that allows instructions of the components of operating system to be executed on any processor located within the information processing system 700. The network adapter hardware 710 is used to provide an interface to a network 718. Embodiments of the present invention are able to be adapted to work with any data communications connections including present day analog and/or digital techniques and any future networking mechanism.

Although the exemplary embodiments of the present invention are described in the context of a fully functional computer system, those of ordinary skill in the art will appreciate that various embodiments are capable of being distributed as a program product via CD or DVD, CD-ROM, or other form of recordable media, or via any type of electronic transmission mechanism.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Also, each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. A method for compressing results of a join query, the method comprising:
    determining a join order of a result set from the join query, the result set comprising a plurality of tuples;
    maintaining a nested hierarchy of dictionaries based on the join order, wherein maintaining the nested hierarchy of dictionaries comprises: analyzing at least one element in at least one of the tuples; and if a value associated with the at least one element fails to exist in the nested hierarchy of dictionaries, adding the value to the nested hierarchy of dictionaries, wherein a structure of the nested hierarchy of dictionaries is organized based on the join order;
    using, by a processor, the nested hierarchy of dictionaries to encode each tuple of the tuples of the result set so as to produce an encode tuple, wherein the nested hierarchy of dictionaries comprises a set of leaf level dictionaries and a set of intermediate level dictionaries, the set of leaf level dictionaries mapping data tuple fragments to a first set of code, and the set of intermediate level dictionaries mapping a tuple created from the first set of code to a second set of code that is smaller than the first set of code; and
    transmitting each encoded tuple of the encoded tuples to a client system, wherein the transmitting comprises transmitting at least one encoded tuple with a set of dictionary entry information associated with that encoded tuple, the set of dictionary entry information indicating to the client system a location in a set of corresponding nested hierarchy of dictionaries to store the set of dictionary entry information.

2. The method of claim 1, wherein using the nested hierarchy of dictionaries to encode each tuple of the tuples comprises: generating, for each tuple of the tuples, a set of data that is smaller in size than that tuple, the set of data being mapped to a corresponding set of data in the nested hierarchy of dictionaries.

3. The method of claim 1, wherein the set of dictionary entry information is transmitted as plaintext with a flag that indicates that the plaintext is a set of dictionary entry information.

4. The method of claim 1, wherein each position in each encoded tuple of the encoded tuples is associated with a table identifier within the nested hierarchy of dictionaries, each table identifier of the table identifiers being associated with a different table used to create the result set, and each value at each position in each encoded tuple of the encoded tuples identifying a location of an entry within the nested hierarchy of dictionaries.

5. The method of claim 1, wherein each position in each encoded tuple of the encoded tuples is associated with a column identifier within the nested hierarchy of dictionaries, each column identifier of the column identifiers being associated with a different column in the result set, and each value at each position in each encoded tuple of the encoded tuples identifying a location of an entry within the nested hierarchy of dictionaries.

6. A non-transitory computer readable medium encoded with a program for compressing results of a join query, the program comprising instructions for:
    determining a join order of a result set from the join query, the result set comprising a plurality of tuples;
    maintaining a nested hierarchy of dictionaries based on the join order, wherein maintaining the nested hierarchy of dictionaries comprises: analyzing at least one element in at least one tuple of the tuples; and if a value associated with the at least one element fails to exist in the nested hierarchy of dictionaries, adding the value to the nested hierarchy of dictionaries, wherein a structure of the nested hierarchy of dictionaries is organized based on the join order;
    using the nested hierarchy of dictionaries to encode each tuple of the tuples of the result set so as to produce an encode tuple, wherein the nested hierarchy of dictionaries comprises a set of leaf level dictionaries and a set of intermediate level dictionaries, the set of leaf level dictionaries mapping data tuple fragments to a first set of code, and the set of intermediate level dictionaries mapping a tuple created from the first set of code to a second set of code that is smaller than the first set of code; and
    transmitting each encoded tuple of the encoded tuples to a client system, wherein the transmitting comprises transmitting at least one encoded tuple with a set of dictionary entry information associated with that encoded tuple, the set of dictionary entry information indicating to the client system a location in a set of corresponding nested hierarchy of dictionaries to store the set of dictionary entry information.

7. The non-transitory computer readable medium of claim 6, wherein using the nested hierarchy of dictionaries to encode each tuple of the tuples comprises: generating, for each tuple of the tuples, a set of data that is smaller in size than that tuple, the set of data being mapped to a corresponding set of data in the nested hierarchy of dictionaries.

8. The non-transitory computer readable medium of claim 6, wherein each position in each encoded tuple of the encoded tuples is associated with a column identifier within the nested hierarchy of dictionaries, each column identifier of the column identifiers being associated with a different column in the result set, and each value at each position in each encoded tuple of the encoded tuples identifying a location of an entry within the nested hierarchy of dictionaries.

9. An information processing system for compressing results of a join query, the information processing system comprising:

a memory;

a processor communicatively coupled to the memory a result encoder for:

determining a join order of a result set from the join query, the result set comprising a plurality of tuples;

maintaining a nested hierarchy of dictionaries based on the join order, wherein maintaining the nested hierarchy of dictionaries comprises: analyzing at least one element in at least one tuple of the tuples; and if a value associated with the at least one element fails to exist in the nested hierarchy of dictionaries, adding the value to the nested hierarchy of dictionaries, wherein a structure of the nested hierarchy of dictionaries is organized based on the join order; and using the nested hierarchy of dictionaries to encode each tuple of the tuples of the result set so as to produce an encode tuple, wherein the nested hierarchy of dictionaries comprises a set of leaf level dictionaries and a set of intermediate level dictionaries, the set of leaf level dictionaries mapping data tuple fragments to a first set of code, and the set of intermediate level dictionaries mapping a tuple created from the first set of code to a second set of code that is smaller than the first set of code; and an interface for transmitting each encoded tuple of the encoded tuples to a client system, wherein the transmitting comprises transmitting at least one encoded tuple with a set of dictionary entry information associated with that encoded tuple, the set of dictionary entry information indicating to the client system a location in a set of corresponding nested hierarchy of dictionaries to store the set of dictionary entry information.

* * * * *